United States Patent
Kim et al.

(10) Patent No.: US 10,369,999 B2
(45) Date of Patent: Aug. 6, 2019

(54) METHOD FOR PROVIDING SOUND DETECTION INFORMATION, APPARATUS DETECTING SOUND AROUND VEHICLE, AND VEHICLE INCLUDING THE SAME

(71) Applicant: HYUNDAI MOTOR COMPANY, Seoul (KR)

(72) Inventors: Jae Kwang Kim, Seoul (KR); Yoon Ho Jang, Suwon-si (KR); Kang Hoon Lee, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 258 days.

(21) Appl. No.: 15/400,234

(22) Filed: Jan. 6, 2017

(65) Prior Publication Data

US 2017/0305427 A1 Oct. 26, 2017

(30) Foreign Application Priority Data

Apr. 21, 2016 (KR) ........................ 10-2016-0048647

(51) Int. Cl.
*B60W 10/30* (2006.01)
*B60W 30/18* (2012.01)
(Continued)

(52) U.S. Cl.
CPC ... *B60W 30/18009* (2013.01); *B60H 1/00771* (2013.01); *B60Q 1/143* (2013.01); *B60Q 1/2603* (2013.01); *B60W 10/30* (2013.01); *B60W 40/02* (2013.01); *B60W 50/0098* (2013.01); *B60H 2001/3266* (2013.01); *B60Q 1/1423* (2013.01); *B60Q 1/20* (2013.01); *B60Q 2300/30* (2013.01); *B60Q 2300/337* (2013.01); *B60W 2050/0075* (2013.01); *B60W 2420/54* (2013.01);
(Continued)

(58) Field of Classification Search
None
See application file for complete search history.

(56) References Cited

U.S. PATENT DOCUMENTS

2009/0285409 A1* 11/2009 Yoshizawa ............ G01S 3/8083 381/92
2010/0228482 A1* 9/2010 Yonak ................... G01S 3/8083 701/301

(Continued)

FOREIGN PATENT DOCUMENTS

JP  H60-151521 A  8/1985
JP  6-194218 A  7/1994
(Continued)

OTHER PUBLICATIONS

Office Action dated May 12, 2017, issued in corresponding Korean Patent Application No. 10-2016-0048647.

*Primary Examiner* — Anshul Sood
(74) *Attorney, Agent, or Firm* — Morgan, Lewis & Bockius LLP

(57) ABSTRACT

A method for providing sound detection information includes steps of: sensing sound around a host vehicle to generate sound data; generating a result of sound detection based on the sound data; calculating a rate of change based on the result of sound detection; generating a result of tunnel detection by comparing the rate of change with a threshold; and controlling at least one peripheral apparatus in the host vehicle according to the result of tunnel detection.

18 Claims, 7 Drawing Sheets

(51) Int. Cl.
| | |
|---|---|
| *B60W 40/02* | (2006.01) |
| *B60H 1/00* | (2006.01) |
| *B60W 50/00* | (2006.01) |
| *B60Q 1/14* | (2006.01) |
| *B60Q 1/26* | (2006.01) |
| *B60H 1/32* | (2006.01) |
| *B60Q 1/20* | (2006.01) |
| *H04R 3/00* | (2006.01) |

(52) U.S. Cl.
CPC ... *B60W 2550/141* (2013.01); *B60W 2710/30* (2013.01); *H04R 3/005* (2013.01); *H04R 2430/21* (2013.01); *H04R 2499/13* (2013.01)

(56) References Cited

U.S. PATENT DOCUMENTS

2011/0175755 A1* 7/2011 Yoshioka .............. G01S 3/8083
  340/995.1
2013/0010980 A1* 1/2013 Yoshioka ................ G01S 3/802
  381/92

FOREIGN PATENT DOCUMENTS

| JP | 2009-164932 A | | 7/2009 |
|---|---|---|---|
| JP | 2009164932 A | * | 7/2009 |
| JP | 2011-242343 A | | 12/2011 |
| JP | 2011242343 A | * | 12/2011 |
| KR | 10-1998-0002601 A | | 3/1998 |
| KR | 10-0309350 B1 | | 9/2001 |
| KR | 10-2007-0039283 A | | 4/2007 |
| KR | 10-0836348 B1 | | 6/2008 |

* cited by examiner

FIG. 9
$$R(\text{Rate of change}) = \sum_{t=1}^{n-1}(|p_1^t - p_1^{t+1}| + |p_2^t - p_2^{t+1}|)$$
FIG. 10
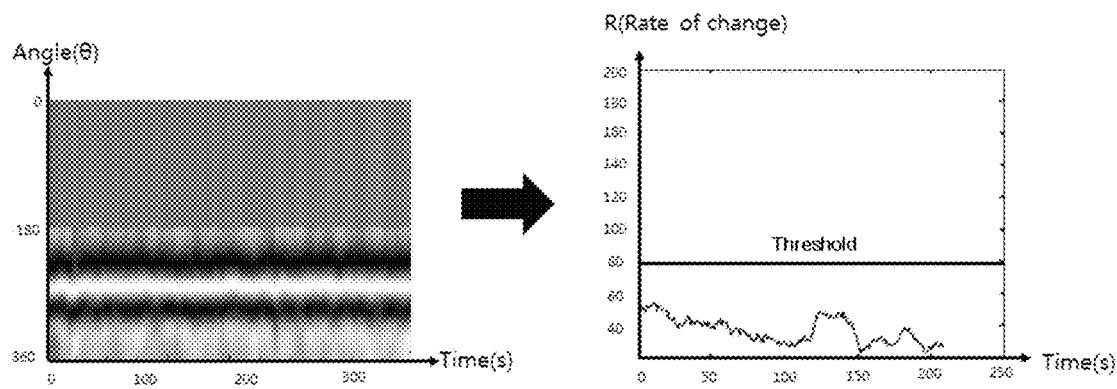
FIG. 11
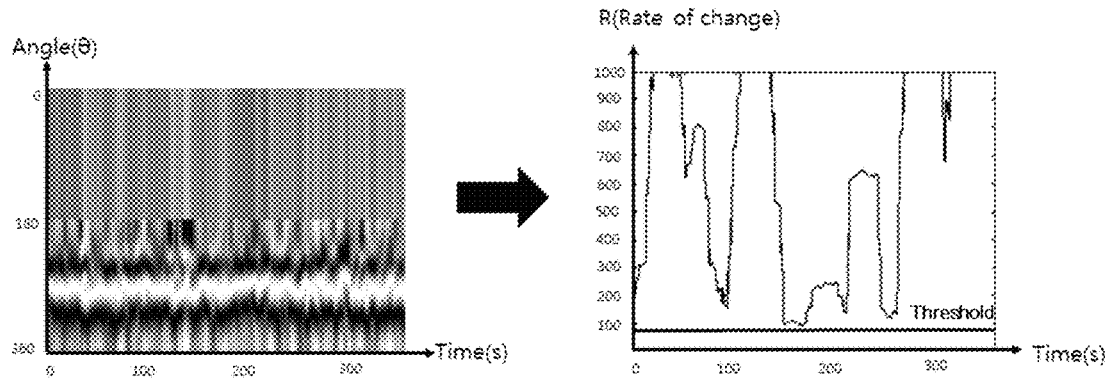

METHOD FOR PROVIDING SOUND DETECTION INFORMATION, APPARATUS DETECTING SOUND AROUND VEHICLE, AND VEHICLE INCLUDING THE SAME

CROSS-REFERENCE TO RELATED APPLICATION(S)

This application claims the benefit of priority to Korean Patent Application No. 10-2016-0048647, filed on Apr. 21, 2016 in the Korean Intellectual Property Office, the entire disclosure of which is hereby incorporated by reference.

TECHNICAL FIELD

The present disclosure relates to a method for providing sound detection information, an apparatus for detecting sound around a vehicle, and a vehicle including the same, and more particularly, to a method for providing sound detection information, an apparatus for detecting sound around a vehicle, and a vehicle including the same which enable accurate recognition of entry of the vehicle into a tunnel.

BACKGROUND

Various sounds may be generated around a travelling vehicle. However, an elderly person having hearing impairment or a driver having a poor sense of direction concerning hearing may be less responsive to specific sounds (e.g., the honk of a horn, the sound of a siren, etc.) to which the driver should pay attention. In addition, with gradual development of vehicle technology, even persons having a keen sense of hearing often encounter a situation where they cannot accurately sense a noise generated outside the vehicle. Moreover, driving safety may be threatened if the driver recognizing a specific sound generated from behind the vehicle turns around to check the sound.

Thus, there is a need for a technology to report information about a specific sound such as the identity of the sound generated around the vehicle and the direction of the sound, without undermining driving safety.

In addition, when a vehicle enters a tunnel, manipulation of peripheral devices such as an air conditioner, windows including the sunroof, and headlights in the vehicle is needed. However, this manipulation may distract the driver from the road, resulting in a situation threatening driving safety.

SUMMARY

Accordingly, the present disclosure is directed to a method for providing sound detection information, an apparatus for detecting sound around a vehicle, and a vehicle including the same that substantially obviate one or more problems due to limitations and disadvantages of the related art.

An object of the present disclosure is to provide a method for providing sound detection information, an apparatus for detecting sound around a vehicle, and a vehicle including the same which enable automatic control of peripheral devices by recognizing entry of the vehicle into a tunnel using information about sound around the vehicle.

Additional advantages, objects, and features of the disclosure will be set forth in part in the description which follows and in part will become apparent to those having ordinary skill in the art upon examination of the following or may be learned from practice of the exemplary embodiments. The objectives and other advantages of the present disclosure may be realized and attained by the structure particularly pointed out in the written description and claims hereof as well as the appended drawings.

To achieve these objects and other advantages and in accordance with the purpose of the disclosure, as embodied and broadly described herein, a method for providing sound detection information includes sensing sound around a host vehicle to generate sound data; generating a result of sound detection based on the sound data; calculating a rate of change based on the result of sound detection; generating a result of tunnel detection by comparing the rate of change with a threshold; and controlling at least one peripheral apparatus in the host vehicle according to the result of tunnel detection.

The result of sound detection may be information about probabilities of presence of a neighboring vehicle at respective angles in each of temporally consecutive frames.

According to another aspect of the present disclosure, an apparatus for detecting sound around a vehicle includes a sound detector for generating a result of sound detection based on sound data generated by sensing sound generated around a host vehicle, a tunnel detector for calculating, based on the result of sound detection, a rate of change forming a basis of determination of entry into a tunnel and generating a result of tunnel detection by comparing the rate of change with a threshold, and a control signal generator for generating a control signal for controlling at least one peripheral apparatus in the host vehicle according to the result of tunnel detection, wherein the result of sound detection is information about probabilities of presence of a neighboring vehicle at respective angles in each of temporally consecutive frames.

According to another aspect of the present disclosure, a vehicle includes a sound detector sensing sound around a host vehicle and generating a result of sound detection based on the sound data; a tunnel detector calculating a rate of change based on the result of sound detection and generating a result of tunnel detection by comparing the rate of change with a threshold; and a control signal generator generating a control signal for controlling at least one peripheral apparatus in the host vehicle according to the result of tunnel detection.

It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the present disclosure and together with the description serve to explain the principles disclosed. In the drawings:

FIG. 9 shows an equation for calculation of the rate of change; and

FIGS. 10 and 11 illustrate examples of generation of a tunnel detection result from a result of sound detection.

DETAILED DESCRIPTION

Reference will now be made in detail to the exemplary embodiments in the present disclosure, examples of which are illustrated in the accompanying drawings. Wherever possible, the same reference numbers will be used throughout the drawings to refer to the same or like parts. As used herein, the suffixes "module" and "unit" are added or used interchangeably to simply facilitate preparation of this specification and are not intended to suggest meanings or functions distinguished therebetween.

Figure 1:
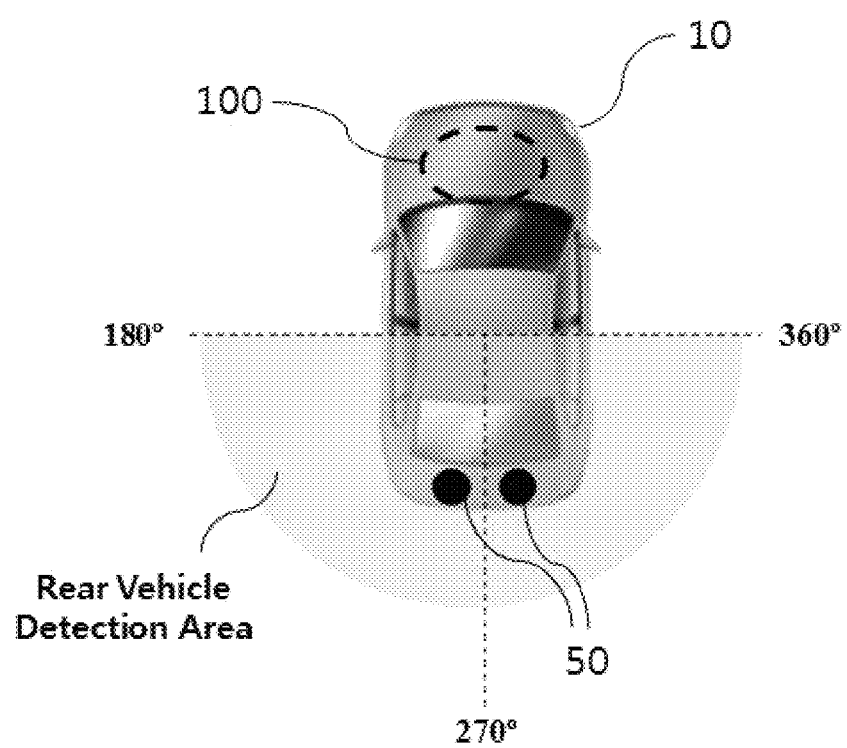
FIG. 1 illustrates a vehicle according to an exemplary embodiment in the present disclosure.

FIG. 1 illustrates a vehicle according to an exemplary embodiment in the present disclosure.

Referring to FIG. 1, a vehicle 10 may report information about a specific sound such as the source and direction of the sound generated around the vehicle during travel manipulated by the driver.

The vehicle 10 may include multichannel microphones 50 capable of collecting external sound and a sound detection apparatus 100 capable of generating information about specific sound based on the collected sound information. Each of the multichannel microphones 50 may be understood as one channel. The number of the multichannel microphones 50 (i.e., 2 or 3) and the installation position thereof in the vehicle 10 are not limited to the example illustrated in FIG. 1.

When two multichannel microphones 50 are provided as shown in FIG. 1, the information about the sound collected by the multichannel microphones 50 is assumed to be used in generating a result of sound detection performed by the sound detection apparatus 100 in a rear vehicle detection area on the condition that neighboring vehicles in the front area (in the range between 0° and 180°) other than the rear area (in the range between 180° and 360°) need not be detected.

Operation of the sound detection apparatus 100 will be described in detail with reference to FIG. 2 later in this specification.

Figure 2:
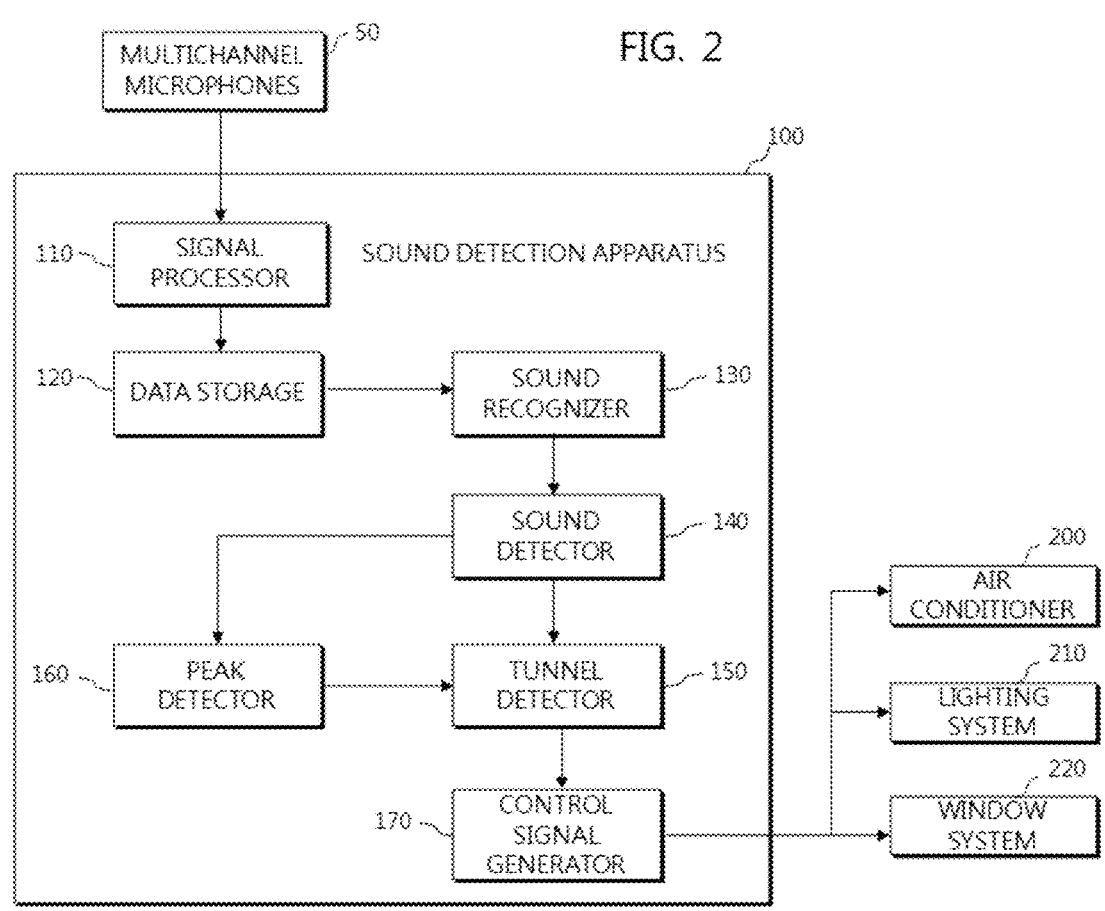
FIG. 2 is a block diagram specifically illustrating the sound detection apparatus shown in FIG. 1.

FIG. 2 is a block diagram specifically illustrating the sound detection apparatus shown in FIG. 1.

Referring to FIG. 2, the sound detection apparatus 100 may include a signal processor 110, a data storage 120, a sound recognizer 130, a sound detector 140, a tunnel detector 150, a peak detector 160, and a control signal generator 170. The sound detection apparatus 100, which is designed for a vehicle, may be implemented as a part of a head unit of the vehicle 10, but embodiments of the present disclosure are not limited thereto.

The multichannel microphones 50 may sense sound generated around the vehicle 10, generate sound data through analog-to-digital conversion, and transmit the generated sound data to the signal processor 110.

Various sounds are present around a vehicle. The sounds include engine sound or frictional sound of tires of other vehicles positioned around the vehicle, sound generated from a traffic light, an electronic display and the like, and typical sounds of nature.

During driving, it is beneficial to the driver to know the movement of an unwatchable vehicle which is travelling in front of, at one side of, at rear left or right side of, or behind the vehicle 10 (e.g., whether the vehicle intends to pass by the vehicle of the driver) and the relative position thereof.

Some of the external sounds are not transferred to the driver, being blocked by a soundproofing system of the vehicle 10. When the driver hears a horn outside the vehicle 10 honking, it benefits the driver to know where this honk comes from and whether or not the honk is directed at the vehicle of the driver. Depending on whether the driver recognizes the honk of the horn, the driver may take various measures including, for example, accelerating the vehicle, changing lanes, and operating the emergency light.

The driver may fail to hear the honk of a horn as the volume of the audio system in the vehicle of the driver is set to an excessively high level. In this case, the driver needs to be notified that the horn has been honked around the vehicle of the driver in a visual manner or through the audio system of the vehicle.

The driver may be interested in other sounds as well. For example, when the vehicle makes a sudden stop, large frictional sound is generated due to friction between the tires and the ground. Such frictional sound may be related to occurrence of a traffic accident or a situation immediately before a traffic accident and thus requires the driver's attention. As another example, when an accident is caused by a collision with another vehicle, a crash sound is generated. If the sound made by front crash or side crash is recognized and the driver is notified of the direction from which the crashing sound comes, other subsequent accidents may be prevented.

If a police car or ambulance near the driver blows a siren, the driver should take a measure such as changing lanes to allow the police car or ambulance to pass by. In a particular case, the user may face legal punishment if he does not take a necessary measure. Accordingly, there is a need for a technology enabling the driver to recognize the sound of a siren from a vehicle belonging to a public organization.

The signal processor 110 may perform noise filtering on the acquired sound data. Through noise filtering, various noises whose properties or sources are unrecognizable may be removed. Most sounds in which the user is interested in, including the honk of a horn, the sound of a siren, the frictional sound of tires, and a crashing sound, have sufficiently high decibel levels (higher than or equal to 70 dB). Accordingly, the signal processor 110 may determine whether the decibel level (i.e., the magnitude) of the sound data is higher than or equal to a threshold. That is, sound data whose decibel level is lower than the threshold may be removed by the signal processor 110.

The data storage 120 may store the sound data with noises removed. The data storage 120 may store the sound data on a frame-by-frame basis and provide the same to the sound recognizer 130 on the frame-by-frame basis. Herein, the frame may refer to sound data collected at the same time. The interval between frames may have a specific period (e.g., ms, 100 ms, etc.). However, the present exemplary embodiment is not limited thereto.

The sound recognizer 130 determines the features of the sound data. Sound data may not be significant to the driver even if the decibel level thereof is higher than or equal to a threshold. For example, sound made when a train passes and a noise made by an airplane near an airport have significantly high decibel levels, but may not significantly affect driving. Nor do noises made by road recovery or construction for road rearrangement significantly affect driving. Continuously notifying the driver of the sound data of such noises may slow the response of the driver to a situation which the driver needs to recognize, or obstruct the driver from responding to the situation.

In the time domain or frequency domain, the sound recognizer 130 extracts feature values of the sound data received from the data storage 120. The sound recognizer 130 may build a database of the average and variance of the feature values. Herein, the feature values may be the values of Mel-frequency cepstral coefficients (MFCC), total power spectrum, sub-band spectrum power, and/or pitch frequency. The sound recognizer 130 may store, in the database, the average and variance for the frames within a predetermined time period, e.g., 100 ms.

Mel-frequency cepstrum (MFC) used in the field of voice signal processing is a method of representing a power spectrum of a short-term signal. The power spectrum of a short-term signal may be acquired by performing cosine transformation on the logarithmic power spectrum in the frequency domain in a non-linear Mel scale. MFCC refers to a collection of coefficients of multiple MFCs. Typically, according to the MFCC, the short-term sound data (signal) is subjected to pre-emphasis filtering and then to discrete Fourier transform. Thereafter, the power spectrum of the signal is estimated using Mel filter banks in Mel scale, and then a logarithmic operation is performed on the respective powers in Mel scale. Then, an MFCC value is obtained by applying discrete cosine transform to the value obtained through the logarithmic operation.

The total power spectrum represents distribution of energy of the total spectrum within a predetermined frame interval. Typically, sub-band powers represent energy distribution values of the spectrum in 4 sub-band intervals such as [0, ⅛f0], [⅛f0, ¼f0], [¼f0, ½f0], and [½f0, f0]. The pitch frequency may be acquired by detecting the peak point of a normalized autocorrelation function.

The sound recognizer 130 may classify the feature values of the acquired sound data using a classifier and determine whether the acquired sound data corresponds to a sound in which the user is interested. The classifier may be one of a neural network (NN) classifier, a support vector machine (SVM) classifier, and a Bayesian classifier.

In this specification, it is assumed that the classifier is an NN classifier.

Using the feature values of the sound data acquired by classifying sounds into a plurality of classes according to the types of sounds, the classifier of the sound recognizer 130 may calculate a confidence level based on similarity between the sound data and the plurality of classes. That is, a confidence level may represent a probability that the sound data corresponds to the sound of a specific class, and the total sum of the confidence levels may be 1.

The result of sound classification generated by the classifier of the sound recognizer 130 may include information about the respective classes, types of sound corresponding to the respective classes, and confidence levels corresponding to the respective classes.

The sound recognizer 130 may generate a determination result according to whether the confidence level is higher than or equal to a threshold (e.g., 0.7) and include the same in the sound classification result. That is, if the confidence level is higher than or equal to the threshold, the sound recognizer 130 may determine the type of sound of a class corresponding to the confidence level as the type of the present sound data.

Accordingly, the sound recognizer 130 may generate a sound classification result which is information about the type of sound corresponding to the sound data, by analyzing the features of the sound data.

The sound detector 140 may detect the direction of the source of generated sound, based on the sound data for the sound type (or target sound source) of a class having a confidence level higher than or equal to the threshold. The sound type may be provided from the sound recognizer 130.

The sound detector 140 may accumulate sound data corresponding to consecutive frames to identify the sameness of the sounds input through the respective microphones based on the visual features (waveforms) of the sounds, compare the intensities of the same sound and calculate the difference in arrival time of the sounds reaching the respective microphones. The visual features may be provided by the sound recognizer 130.

The intensity of sound is inversely proportional to the square of the distance. Accordingly, when the distance from the source of generated sound doubles, the intensity of the sound decreases to ¼ of the intensity (to about 6 dB). When it is assumed that the width and length of a typical vehicle is about 2 m and about 3 m, respectively, the difference in intensity of the sensed sound may have a sufficiently significant value depending on the location of the point at which the sound is generated.

For example, when the multichannel microphones 50 are disposed as shown in FIG. 1, and a sound is generated at an upper right end of the vehicle, the intensity of the sound sensed by the microphone positioned at the upper end of the vehicle is higher than the average of the intensities of the sound sensed by the microphones positioned at the lower left and right ends of the vehicle. In addition, the intensity of the sound sensed by the microphone positioned at the lower right end of the vehicle is higher than the intensity of the sound sensed by the microphone positioned at the lower left end of the vehicle.

Based on these properties, the approximate direction of the source of sound with respect to the center of the vehicle 10 may be detected using the intensities of the sound collected from the respective microphones.

Moreover, an angle corresponding to the position of the source of the generated sound may be calculated using the difference between the arrival times of the sound that reaches the respective microphones. The sound detector 140 pre-stores a table of mapping between a network or the position of the source of the generated sound and a signal delay corresponding to each microphone. For example, in this table, when the number of the multichannel microphones 50 is 3, the angle of FIG. 1 may be mapped to t1 (a signal delay for a first microphone), t2 (a signal delay for a second microphone), and t3 (a signal delay for a third microphone), and the probability of presence of a detected object at the angle of FIG. 1 may be calculated by applying the signal delays of t1, t2 and t3 to the sound data for the respective microphones stored in the data storage 120 and then summing the results of the application. Of course, when the number of the multichannel microphones 50 is 2 as shown in FIG. 1, signal delays corresponding to the respective microphones may be mapped to the angle for the position of the source of the generated sound between 180° and 360° in the table, and the probability of presence of a detected object at the angle of FIG. 1 may be calculated by applying the signal delays of t1 and t2 to the sound data of the respective microphones stored in the data storage 120 and then summing the results of the application.

That is, by applying delay values for all angles to the present signal, the probability of presence of a detected object at each angle may be estimated. Thereby, the position of the source of the generated sound may be estimated. This is possible because the angle for the position of the sound source has a one-to-one correspondence relationship with a combination of signal delays corresponding to the respective microphones.

Using such information, the sound detector 140 may generate a result of sound detection at the respective angles (angles with respect to the center of the vehicle 10) in each of the frames consecutive over time.

The result of sound detection may be information about the probabilities of presence of an object corresponding to a target sound source at the respective angles in each of the frames consecutive over time.

In this specification, it is assumed that the target sound source is limited to frictional sound of tires of a vehicle. Therefore, the results of sound detection may be information about the probabilities of presence of a vehicle (hereinafter, a "neighboring vehicle") travelling around an object (the vehicle 10) (hereinafter, a "host vehicle") corresponding to the frictional sound of tires in each of the frames consecutive over time.

The tunnel detector 150 may generate a result of tunnel detection indicating whether or not the vehicle 10 has entered a tunnel, based on the probability of presence of a neighboring vehicle at each angle in the result of sound detection. The tunnel detection result may include not only information about whether the vehicle has entered a tunnel but also information about whether the vehicle has exited (or left) the tunnel.

The tunnel detector 150 may determine entry into/exit from the tunnel based on the information provided from the peak detector 160. The tunnel detector 150 may deliver the result of tunnel detection to the control signal generator 170.

The peak detector 160 may detect a peak value of the result of sound detection based on the result of sound detection. The peak detector 160 may provide the peak value of the result of sound detection to the tunnel detector 150.

Detection of entry into or exit from a tunnel performed by the tunnel detector 150 and detection of a peak value performed by the peak detector 160 will be described in detail with reference to FIGS. 4 to 11 later.

The control signal generator 170 may generate, based on the result of tunnel detection, a signal for controlling at least one peripheral device that needs to be controlled when the vehicle enters or exits a tunnel. When the result of tunnel detection indicates entry into a tunnel for the first time, the control signal generator 170 may generate a control signal for switching the peripheral devices to modes appropriate for travel in the tunnel. Thereafter, when the result of tunnel detection indicates exit from the tunnel for the first time, the control signal generator 170 may generate a control signal for switching the peripheral devices back to the modes prior to entry into the tunnel.

The peripheral devices may include an air conditioner 200, a lighting system 210, and a window system 220. The control signal generator 170 may transmit control signals to all of the air conditioner 200, lighting system 210, and window system 220, or may not transmit a control signal to a specific device depending on user settings.

The air conditioner 200 refers to a heating, ventilation and air conditioning system. When the air conditioner 200 is set to an external air mode, external air may be introduced into the vehicle from the outside of the vehicle. Accordingly, if the result of tunnel detection indicates entry of the vehicle 10 into a tunnel, the control signal generator 170 may generate a control signal for controlling the external air mode of the air conditioner 200 to be terminated. On the other hand, if the result of tunnel detection indicates exit of the vehicle 10 from the tunnel, the control signal generator 170 may generate a control signal for controlling the air conditioner 200 to switch back to the external air mode. Of course, if the external air mode was not set before entry of the vehicle 10 into the tunnel, the air conditioner 200 may not enter the external air mode in spite of the control signal. That is, the mode of the air conditioner 200 immediately before entry into a tunnel needs to be stored. The storage operation may be performed by the control signal generator 170 or by the air conditioner 200.

The lighting system 210 may refer to a system configured to control exterior lights such as a turn signal lamp, a taillight, a headlight, a high beam, and a fog light. When the vehicle enters a tunnel, turning on the headlight may contribute to safe driving. Accordingly, if the result of tunnel detection indicates that the vehicle 10 has entered a tunnel, the control signal generator 170 may generate a control signal for controlling the lighting system 210 to turn on the taillight. On the other hand, if the result of tunnel detection indicates that the vehicle 10 has exited the tunnel, the control signal generator 170 may generate a control signal for controlling the lighting system 210 to turn off the taillight. Of course, if the taillight was on prior to entry of the vehicle 10 into the tunnel, the control signal generator 170 may not turn off the taillight in spite of the control signal. That is, the mode of the lighting system 210 immediately before entry into a tunnel needs to be stored. This storage operation may be performed by the control signal generator 170 or by the lighting system 210.

The window system 220 may refer to a system configured to control the sunroof and left and right windows of the vehicle 10. When the vehicle enters the tunnel, closing the windows may prevent the air in the tunnel from being introduced into the vehicle. Accordingly, if the result of tunnel detection indicates that the vehicle 10 has entered a tunnel, the control signal generator 170 may generate a control signal for controlling the window system 220 to close all windows. On the other hand, if the result of tunnel detection indicates that the vehicle 10 has exited the tunnel, the control signal generator 170 may generate a control signal for controlling the window system 220 to switch all the windows to the open position which is the previous position of the windows. Of course, if all the windows were closed before entry of the vehicle 10 into the tunnel, the window system 220 may not switch the windows to the open position. That is, the mode of the window system 220 immediately before entry into a tunnel needs to be stored. This storage operation may be performed by the control signal generator 170 or by the window system 220.

While the present disclosure illustrates automatically controlling peripheral devices according to the result of tunnel detection, embodiments of the present invention are limited thereto. The result of tunnel detection may also be used to send a notification (in the form of, e.g., a pop-up window, sound or voice) to the driver.

Figure 3:
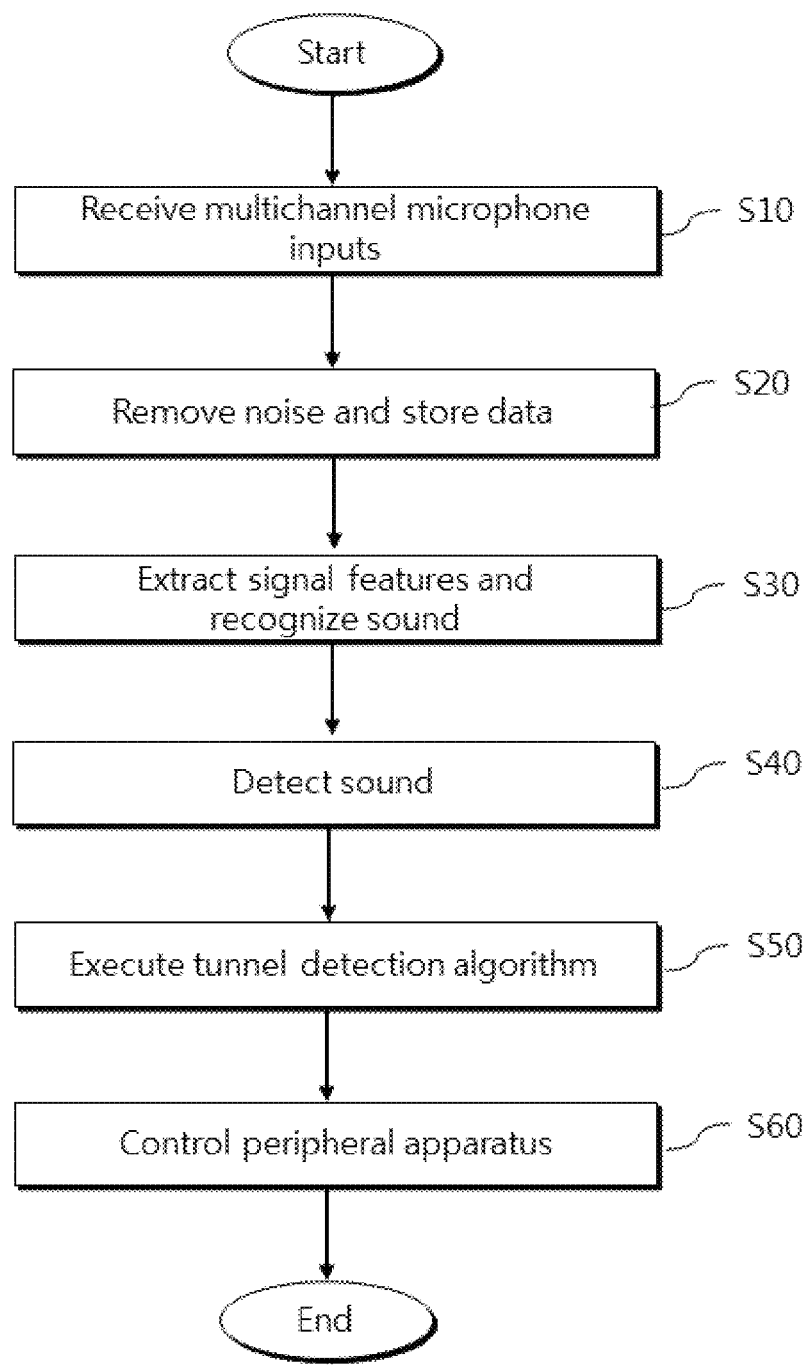
FIG. 3 is a flowchart illustrating operation of the sound detection apparatus shown in FIG. 2.
Figure 4:
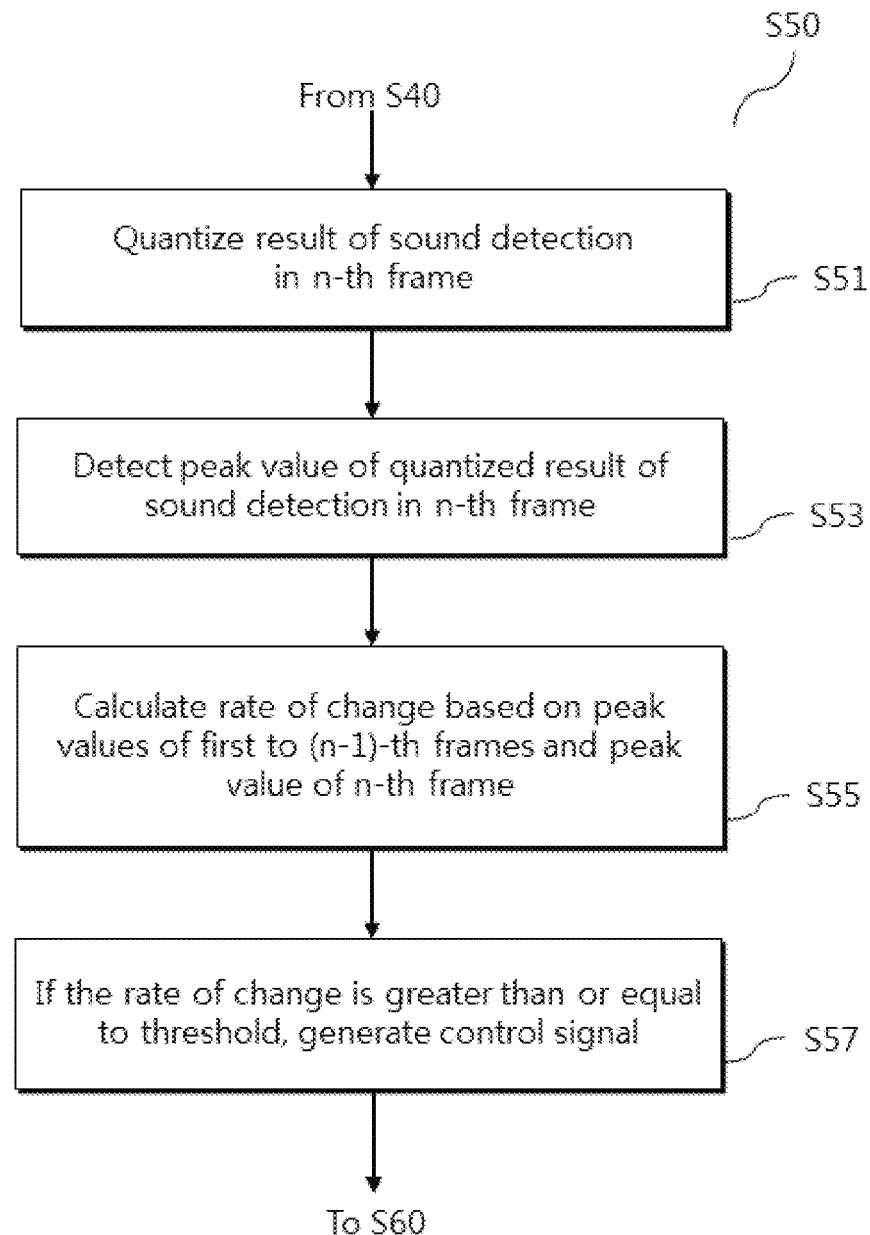
FIG. 4 is a flowchart specifically illustrating step S50 shown in FIG. 3.
Figure 5:
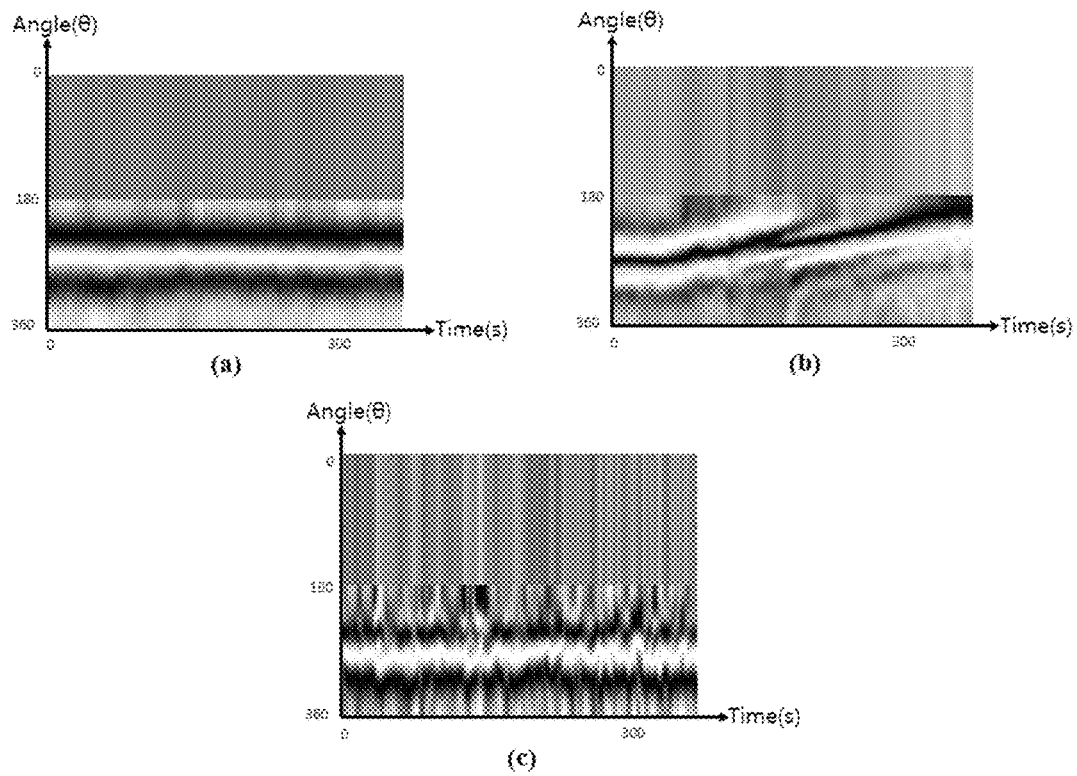
FIG. 5 illustrates comparison between a result of sound detection obtained during non-entry into a tunnel and a result of sound detection obtained during entry into the tunnel.
Figure 6:
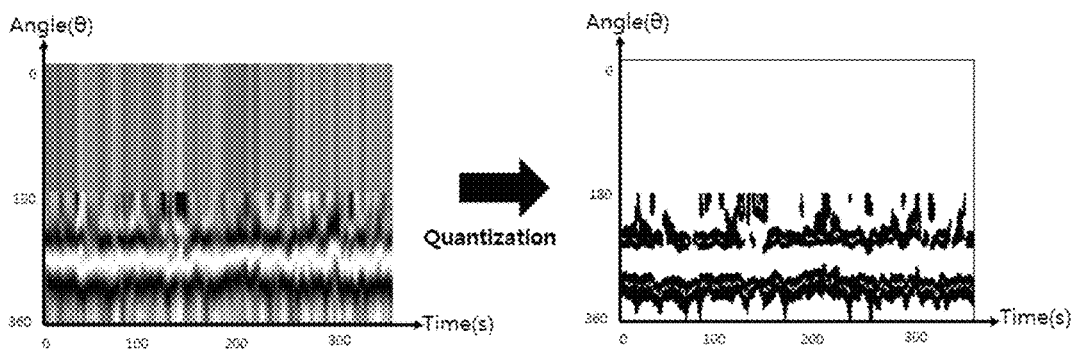
FIG. 6 illustrates quantization of a result of sound detection.
Figure 7:
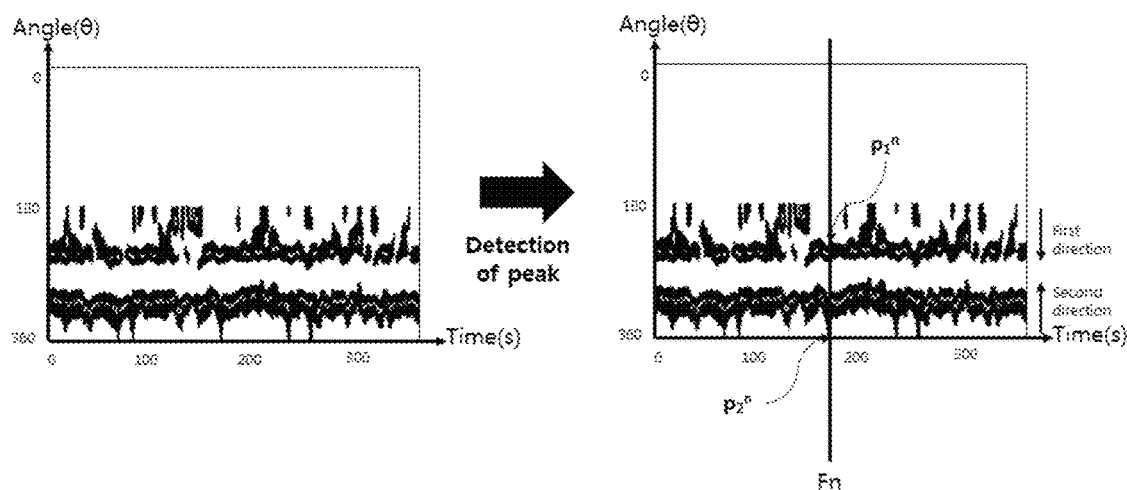
FIG. 7 illustrates an operation of detecting a peak value in a result of sound detection.
Figure 8:
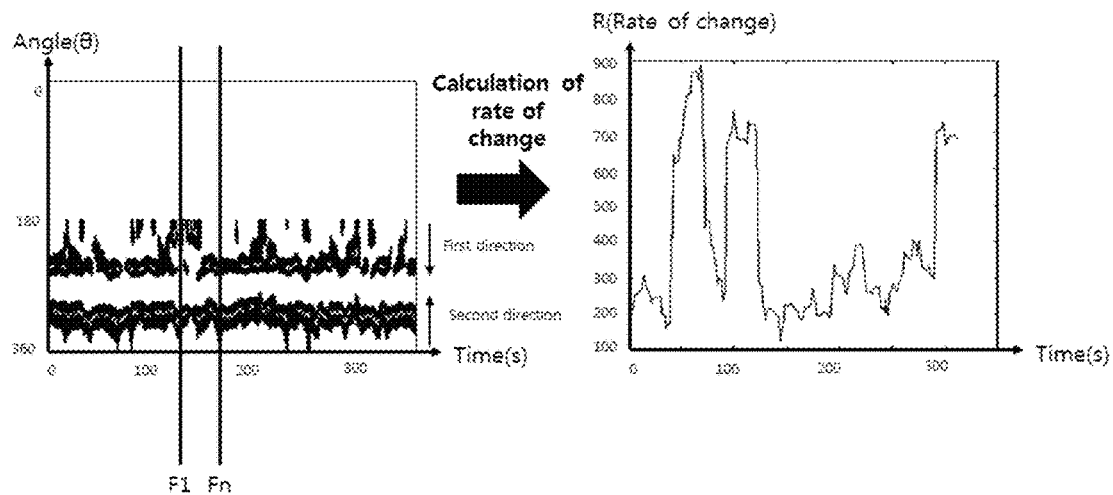
FIG. 8 illustrates an operation of calculating a rate of change for a result of sound detection.

FIG. 3 is a flowchart illustrating operation of the sound detection apparatus shown in FIG. 2. FIG. 4 is a flowchart specifically illustrating step S50 shown in FIG. 3. FIG. 5 illustrates comparison between a result of sound detection obtained during non-entry into a tunnel and a result of sound detection obtained during entry into the tunnel. FIG. 6 illustrates quantization of a result of sound detection FIG. 7 illustrates an operation of detecting a peak value in a result of sound detection. FIG. 8 illustrates an operation of calculating a rate of change for a result of sound detection. FIG. 9 shows an equation for calculation of the rate of change. FIGS. 10 and 11 illustrate examples of generation of a result of tunnel detection from a result of sound detection.

Referring to FIG. 3, a method for operating the sound detection apparatus 100 of FIG. 2, namely, a method for providing sound detection information is illustrated.

The signal processor 110 may receive sound data generated through analog-to-digital conversion of a sensed sound generated around the vehicle 10 (S10).

The signal processor 110 may perform noise filtering on the acquired sound data, and the data storage 120 may store the sound data with the noise removed (S20).

The sound recognizer 130 may extract feature values of the sound data received from the data storage 120 in the time domain and the frequency domain, and generate a result of sound classification by classifying the feature values through a classifier (S30).

The sound detector 140 may generate a result of sound detection which is information about probabilities of presence of each object corresponding to a sound type of a class having a confidence level higher than or equal to a threshold at each angle in each of the frames consecutive over time, based on the sound data (S40).

The tunnel detector 150 may execute a tunnel detection algorithm to generate a result of tunnel detection from the probabilities of presence of a neighboring vehicle at the respective angles of the result of sound detection (S50).

The tunnel detection algorithm is intended to detect whether the vehicle 10 enters or exits a tunnel from the result of sound detection.

FIG. 5 shows graphs depicting results of sound detection generated over time by the sound detector 140 in various travel situations. In the graphs, darker portions may have higher probabilities of presence of a neighboring vehicle (more specifically, frictional sound of tires) at the corresponding angle. In the graph, the horizontal axis represents time (in seconds) and the vertical axis represents angle θ.

FIG. 5(a) shows a result of sound detection generated in a travel situation in which the vehicle 10 travels in a typical environment other than a tunnel, and there is no other vehicle around the vehicle 10. In this travel situation, the sensed frictional sound from the tires of the rear wheels of the vehicle 10 has the highest intensity, and thus darker portions are symmetrically arranged at both sides of 270° as shown in the result of sound detection.

FIG. 5(b) shows a result of sound detection generated in a travel situation in which the vehicle 10 travels in a typical environment other than a tunnel, and a neighboring vehicle positioned in a lane to the left of the lane of the vehicle 10 and behind the vehicle 10 passes by the vehicle 10. In this travel situation, the sensed frictional sound from the tires of the front wheels of the neighboring vehicle has the highest intensity, and darker portions move from around 270° toward 180° as time passes as shown in the result of sound detection.

FIG. 5(c) shows a result of sound detection generated in a travel situation in which the vehicle 10 travels in a tunnel, and there is no other vehicle around the vehicle 10. In this travel situation, the sensed frictional sound from the tires of the front wheels of the vehicle 10 has the highest intensity, but the darker portions exhibit a very irregular pattern as shown in the result of sound detection, compared to the pattern of FIG. 5(a). This is because sound generated from one object (e.g., the frictional sound from the rear left tire of the vehicle 10) is reflected from the closed arch of the tunnel and reaches the multichannel microphones 50 through various paths with various delays.

The tunnel detection algorithm detects whether the vehicle 10 enters or exits a tunnel by analyzing the property of the pattern of the result of sound detection.

Referring to FIG. 4, a result of sound detection of the sound detector 140 may consist of frames consecutive over time, and be delivered to the peak detector 160 on a frame-by-frame basis. A result of sound detection which is currently delivered to the tunnel detector 150 and the peak detector 160 will be defined as an n-th frame Fn (where n is an integer greater than or equal to 1).

The peak detector 160 may quantize the result of sound detection of the n-th frame Fn, which is the present frame (S51).

In FIG. 6, a result of sound detection for a duration between 0 sec and 350 sec is shown on the left side. In this case, the peak detector 160 may quantize the result of sound detection by segmenting the result of sound detection according to whether or not the probability is greater than or equal to 0.6 at the respective angles in each frame. The graph on the right side of FIG. 6 shows the result of quantization. In the illustrated result of sound detection, only portions corresponding to angles and times at which the probability is higher than or equal to 0.6 are represented in black, and the other portions are represented in white For example, the probability may be calculated as 0 or 1 at all angles of a specific frame according to quantization.

Such quantization operation may be performed to detect angles and times at which the probability is higher than or equal to a certain value in each frame.

The peak detector 160 may detect a peak value in the result of sound detection of the n-th quantized frame Fn (S53). Herein, the peak value may represent peak angles in first and second directions in each frame.

In FIG. 7, the quantized result of sound detection is shown on the left side. In this case, the peak detector 160 may detect a peak value in each frame of the quantized result of sound detection. In the n-th frame Fn, for example, the peak value in the first direction from 180° to 360° (the direction in which the angle increases) may be a first peak value $p_1{}^n$, which is the first (or smallest) angular value marked in black. The peak value in the second direction from 360° to 180° (the direction in which the angle decreases) may be a second value $p_2{}^n$, which is the first (or greatest) angular value.

The peak detector 160 may detect the peak value (the first peak value or the second peak value) of the n-th frame Fn of the quantized result of sound detection and provide the same to the tunnel detector 150.

The tunnel detector 150 may calculate the rate of change R based on the peak values in each of the frames from the first to (n−1)-th frames and the peak value in the n-th frame Fn (S55).

The rate of change R is a numerical value corresponding to an accumulation of the degrees of change of the peak value between frames from the first frame to the n-th frame. The rate of change R is the accumulated sum of differences between the corresponding peak values of neighboring frames (e.g., the first peak value of the first frame and the first peak value of the second frame) from the first frame to the n-th frame.

FIG. 9 shows an equation for calculation of the rate of change R. That is, the rate of change R is the result of accumulation of the sum of a difference between the first peak value $p_1^t$ of a frame and the first peak value $p_1^{t+1}$ of the next frame and a difference between the second peak value $p_2^t$ of the frame and the second peak value $p_2^{t+1}$ of the next frame from the first to the last frames.

Herein, n is not limited to any value, but may be experimentally determined to accurately determine entry into/exit from a tunnel based on data accumulated to a certain level rather than on temporary data because the value of n forms the basis of determination of entry into/exit from the tunnel. As n increases, determination of entry into/exit from the tunnel may become more accurate. However, to ensure prompt determination, an appropriate value of n may be selected. Such selection may be determined in manufacturing the sound detection apparatus 100 or in updating software. Alternatively, the selection may be determined by the user through an interface which is extendable or shrinkable according to user convenience.

In FIG. 8, a quantized result of sound detection is shown on the left, and the tunnel detector 150 may be provided with the peak values of respective frames of the quantized result of sound detection to calculate the rate of change R for each frame. In the n-th frame Fn, for example, the tunnel detector 150 may calculate the rate of change R using the first and second peak values for each of the frames from the first frame F1 to the n-th frame Fn. The result of calculation of the rate of change R in each frame is shown on the right side of FIG. 8.

The sum of the difference between the first peak value pit of a frame of and the first peak value $p_1^{t+1}$ of the next frame and the difference between the second peak value $p_2^t$ of the frame and the second peak value $p_2^{t+1}$ of the next frame may be acquired for each of the frames from the first frame F1 to the (n−1)-th frame Fn−1 in calculating the rate of change R in the (n−1)-th frame Fn−1. Accordingly, once calculation of the rate of change R in the (n−1)-th frame Fn−1 is completed, the tunnel detector 150 may store the sum of the difference between the first peak value $p_1^t$ of a frame and the first peak value $p_1^{t+1}$ of the next frame and the difference between the second peak value $p_2^t$ of the frame and the second peak value $p_2^{t+1}$ of the next frame acquired for each of the frames from the first frame F1 to the (n−1)-th frame Fn−1, and utilize the stored values in calculating the rate of change R in the n-th frame, thereby reducing calculation load and the time taken for the detection operation. In this case, the tunnel detector 150 may store the first and second peak values of each of the frames from the first frame F1 to the (n−1)-th frame Fn−1 individually, or store the difference between the first values of neighboring frames and the difference between the second values of neighboring frames for each pair of neighboring frames among the frames from the first frame F1 to the (n−1)-th frame Fn−1. Alternatively, the tunnel detector 150 may store the sum of the differences.

The tunnel detector 150 may generate a result of tunnel detection indicating whether or not the vehicle 10 is travelling in a tunnel by comparing the rate of change in the n-th frame with a threshold. If the result of tunnel detection indicates that the vehicle is travelling in the tunnel, the control signal generator 170 may generate a control signal (a signal notifying entry into a tunnel) for controlling the peripheral devices 200, 210 and 220 (S57). Similarly, if the rate of change in the k-th frame Fk (wherein k is an integer greater than n) after generation of the control signal is less than the threshold, the tunnel detector 150 may generate a result of tunnel detection indicating that the vehicle 10 is not travelling in a tunnel, and the control signal generator 170 may generate, based on the result of tunnel detection, a control signal (a signal notifying exit from the tunnel) for controlling the peripheral devices 200, 210 and 220.

Shown on the right side of FIG. 10 is a result of sound detection obtained when there is no neighboring vehicle around the vehicle 10 in a travel environment other than a tunnel as shown in FIG. 5(*a*). The rate of change R for each frame calculated from this result of sound detection may be presented as shown on the right side of FIG. 10.

If the threshold is set to 80, the tunnel detector 150 may determine that the vehicle 10 has not entered a tunnel at all times in the drawing on the right side of the FIG. 10. Thereby, the control signal generator 170 may not generate a control signal (a signal notifying entry into a tunnel) for controlling the peripheral devices 200, 210 and 220.

The threshold, which is a reference value for determining whether or not the vehicle 10 is travelling in a tunnel, is set to 80 in FIG. 10 or 11. However, this is simply illustrative, and the value of the threshold may be determined through experimentation to accurately determine entry into/exit from the tunnel.

Shown on the right side of FIG. 11 is a result of sound detection obtained when there is no neighboring vehicle around the vehicle 10 in a travel environment of the inside of a tunnel as shown in FIG. 5(*c*). The rate of change R for each frame calculated from the result of sound detection may be presented as shown on the right side of FIG. 11.

If the threshold is set to 80, the tunnel detector 150 may determine that the vehicle 10 has entered a tunnel at all times in the drawing on the right side of FIG. 11. Thereby, when the control signal generator 170 receives a result of tunnel detection indicating that the vehicle is travelling in a tunnel for the first time, it may generate a control signal (a signal notifying entry into a tunnel) for controlling the peripheral devices 200, 210 and 220.

Referring back to FIG. 3, the air conditioner 200, lighting system 210, and window system 220 may be individually controlled to be set to modes appropriate for entry into or exit from the tunnel according to the control signal generated by the control signal generator 170 (S60).

Therefore, with a method for providing sound detection information, an apparatus for detecting sound around a vehicle, and a vehicle including the same according to an exemplary embodiment in the present disclosure configured as above, peripheral devices of the vehicle may be controlled to be set to modes appropriate for tunnel travel by accurately detecting entry into or exit from a tunnel based only on information about sound around the vehicle.

When entry of the vehicle into a tunnel is determined based on a visual element such as a camera or an illumination sensor, entry into/exit from the tunnel may not be detected if there is no change in illumination according to entry into the tunnel or it is night time/foggy.

According to an exemplary embodiment in the present disclosure, entry into and exit from the tunnel may be accurately determined even in the aforementioned environments, thereby contributing to safe driving.

The method for providing sound detection information described above may be implemented in a computer-readable recording medium as code readable by a computer. The computer-readable recording medium includes all kinds of recording media configured to store data readable by the computer system. Examples of the computer-readable recording media include ROMs (read-only memories), RAMs (random access memories), magnetic tapes, magnetic disks, flash memories and optical data storage devices. The computer-readable recording media may be distributed to computer systems connected over a network, and thus computer-readable code may be stored and executed in a distributed manner.

As apparent from the above description, exemplary embodiments in the present disclosure can provide effects as follows.

With a method for providing sound detection information, an apparatus for detecting sound around a vehicle, and a vehicle including the same according to an exemplary embodiment in the present disclosure configured as above, peripheral devices of the vehicle may be controlled to be set to modes appropriate for travel in a tunnel by accurately detecting entry into or exit from the tunnel simply based on information about sound around the vehicle.

Even in an environment making it difficult to determine entry of the vehicle into a tunnel based on visual elements such as a camera or an illumination sensor, entry into and exit from the tunnel may be accurately determined. Thereby, driving safety may be greatly enhanced.

It will be appreciated by those skilled in the art that the effects that can be achieved with the present invention are not limited to what has been described above and other advantages of the present invention will be clearly understood from the following detailed description taken in conjunction with the accompanying drawings.

It will be apparent to those skilled in the art that various modifications and variations can be made to the exemplary embodiments in the present disclosure without departing from the spirit or scope of the disclosure. Thus, it is intended that the present disclosure cover the modifications and variations of this invention provided they come within the scope of the appended claims and their equivalents.

What is claimed is:

1. A method for providing sound detection information, comprising steps of:
   sensing sound around a host vehicle to generate sound data;
   generating a result of sound detection including frames consecutive over time based on the sound data;
   calculating a rate of change of peak values of the frames based on the result of sound detection;
   generating a result of tunnel detection by comparing the rate of change with a threshold; and
   controlling at least one peripheral apparatus in the host vehicle according to the result of tunnel detection,
   wherein the peak values of the frames, which include previous frames and a present frame, include:
     a first peak value indicating a first angle at which a probability higher than or equal to a certain probability is obtained in a first direction for a first time, the first direction being a direction of gradual increase of the first angle; and
     a second peak value indicating a second angle at which a probability higher than or equal to the certain probability is obtained in a second direction for the first time, the second direction being a direction of gradual decrease of the second angle.

2. The method according to claim 1, wherein the result of sound detection is information about probabilities of presence of a neighboring vehicle at respective angles in each of temporally consecutive frames.

3. The method according to claim 1, wherein the step of calculating the rate of change comprises steps of:
   quantizing the result of sound detection;
   detecting a peak value of the quantized result of sound detection; and
   calculating the rate of change based on the peak values of the previous frames and the present frame.

4. The method according to claim 3, wherein the quantizing comprises:
   dividing the result of sound detection into a portion having a probability higher than or equal to the certain probability and a portion having a probability lower than the certain probability.

5. The method according to claim 3, wherein the rate of change is a result of an accumulated sum of a difference between corresponding peak values of neighboring frames from among the peak values of the previous frames and the present frame.

6. The method according to claim 5, wherein a result of the sum of a difference between a first peak value of the present frame and a first peak value of a neighboring frame and a difference between a second peak value of the present frame and a second peak value of the neighboring frame is stored to calculate a rate of change in a frame next to the present frame.

7. The method according to claim 1, wherein the controlling comprises:
   changing the at least one peripheral apparatus to a mode appropriate for travel in a tunnel when the result of tunnel detection indicates entry into the tunnel; and
   changing the at least one peripheral apparatus to a mode prior to entry into the tunnel when the result of tunnel detection indicates exit from the tunnel.

8. The method according to claim 1, wherein the at least one peripheral apparatus comprises at least one of an air conditioner, a lighting system and a window system.

9. An apparatus for detecting sound around a vehicle, comprising:
   a sound detector sensing sound around a host vehicle and generating a result of sound detection including frames consecutive over time based on sound data;
   a tunnel detector calculating a rate of change of peak values of the frames based on the result of sound detection and generating a result of tunnel detection by comparing the rate of change with a threshold; and
   a control signal generator generating a control signal for controlling at least one peripheral apparatus in the host vehicle according to the result of tunnel detection,
   wherein the peak values of the frames, which include previous frames and a present frame, include:
     a first peak value indicating a first angle at which a probability higher than or equal to a certain probability is obtained in a first direction for a first time, the first direction being a direction of gradual increase of the first angle; and
     a second peak value indicating a second angle at which a probability higher than or equal to the certain probability is obtained in a second direction for the first time, the second direction being a direction of gradual decrease of the second angle.

10. The apparatus according to claim 9, wherein the result of sound detection is information about probabilities of presence of a neighboring vehicle at respective angles in each of temporally consecutive frames.

11. The apparatus according to claim 9, further comprising:
    a peak detector quantizing the result of sound detection and detecting a peak value of the quantized result of sound detection,
    wherein the tunnel detector calculates the rate of change based on the peak values of previous frames and the present frame.

12. The apparatus according to claim 11, wherein the peak detector divides the result of sound detection into a portion having a probability higher than or equal to the certain probability and a portion having a probability lower than the certain probability.

13. The apparatus according to claim 11, wherein the rate of change is a result of an accumulated sum of a difference between corresponding peak values of neighboring frames from among the peak values of the previous frames and the present frame.

14. The apparatus according to claim 13, wherein the tunnel detector stores a result of the sum of a difference between a first peak value of the present frame and a first peak value of a neighboring frame and a difference between a second peak value of the present frame and a second peak value of the neighboring frame to calculate a rate of change in a frame next to the present frame.

15. The apparatus according to claim 9, wherein the control signal generator generates a control signal for changing the at least one peripheral apparatus to a mode appropriate for travel in a tunnel when the result of tunnel detection indicates entry into the tunnel, and generates a control signal for changing the at least one peripheral apparatus to a mode prior to entry into the tunnel when the result of tunnel detection indicates exit from the tunnel.

16. The apparatus according to claim 9, wherein the control signal generator generates a control signal for changing the at least one peripheral apparatus to a mode appropriate for travel in the tunnel when the result of tunnel detection indicates entry into a tunnel, and generates a control signal for changing the at least one peripheral apparatus to a mode prior to entry into the tunnel when the result of tunnel detection indicates exit from the tunnel.

17. A vehicle comprising:
a multichannel microphone sensing sound around a host vehicle to generate sound data;
a sound detection apparatus generating a result of sound detection including frames consecutive over time based on the sound data, calculating a rate of change of peak values of the frames based on the result of sound detection, generating a result of tunnel detection by comparing the rate of change with a threshold, and generating a control signal for controlling at least one peripheral apparatus in the host vehicle according to the result of tunnel detection; and
at least one peripheral apparatus comprising at least one of an air conditioner, a lighting, system and a window system, the air conditioner, lighting system and window system being controlled by the control signal,
wherein the peak values of the frames, which include previous frames and a present frame, include:
a first peak value indicating a first angle at which a probability higher than or equal to a certain probability is obtained in a first direction for a first time, the first direction being a direction of gradual increase of the first angle; and
a second peak value indicating a second angle at which a probability higher than or equal to the certain probability is obtained in a second direction for the first time, the second direction being a direction of gradual decrease of the second angle.

18. The vehicle of claim 17, wherein the result of sound detection is information about probabilities of presence of an object corresponding to a target sound source at respective angles in each of temporally consecutive frames.

\* \* \* \* \*